(12) United States Patent
Sato et al.

(10) Patent No.: US 10,612,584 B2
(45) Date of Patent: Apr. 7, 2020

(54) FLUID DYNAMIC BEARING DEVICE, MOTOR, AND DISK DRIVE DEVICE

(71) Applicant: Nidec Corporation, Kyoto (JP)

(72) Inventors: Kazuhiro Sato, Kyoto (JP); Katsuya Takahashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/402,464

(22) Filed: May 3, 2019

(65) Prior Publication Data

US 2020/0003254 A1    Jan. 2, 2020

(30) Foreign Application Priority Data

Jun. 29, 2018    (JP) ................. 2018-125316

(51) Int. Cl.
| | | |
|---|---|---|
| G11B 19/20 | (2006.01) | |
| F16C 17/10 | (2006.01) | |
| F16C 33/10 | (2006.01) | |
| H02K 5/167 | (2006.01) | |
| H02K 7/08 | (2006.01) | |
| H02K 7/14 | (2006.01) | |
| H02K 7/02 | (2006.01) | |
| G11B 5/012 | (2006.01) | |
| H02K 21/22 | (2006.01) | |
| F04D 25/06 | (2006.01) | |

(52) U.S. Cl.
CPC ........ F16C 17/107 (2013.01); F16C 33/1085 (2013.01); G11B 5/012 (2013.01); G11B 19/2036 (2013.01); H02K 5/1677 (2013.01); H02K 7/02 (2013.01); H02K 7/086 (2013.01); H02K 7/14 (2013.01); H02K 21/22 (2013.01); F04D 25/06 (2013.01); F16C 2370/12 (2013.01); F16C 2380/26 (2013.01)

(58) Field of Classification Search
None
See application file for complete search history.

(56) References Cited

U.S. PATENT DOCUMENTS

| | | | |
|---|---|---|---|
| 7,005,768 B2 | 2/2006 | Tamaoka et al. | |
| 7,056,024 B2 * | 6/2006 | Weingord | F16C 17/026 384/100 |
| 7,407,327 B2 * | 8/2008 | Le | F16C 33/107 384/107 |

(Continued)

FOREIGN PATENT DOCUMENTS

| | | |
|---|---|---|
| JP | 2004-052987 A | 2/2004 |
| JP | 2016-217477 A | 12/2016 |

*Primary Examiner* — William J Klimowicz
(74) *Attorney, Agent, or Firm* — Keating & Bennett

(57) ABSTRACT

A fluid dynamic bearing device includes a shaft disposed along a center axis, a sleeve cylindrically extending around the shaft, a thruster that closes a lower end of the sleeve, dynamic pressure grooves in the shaft or the sleeve, and a lubricating oil present therebetween. The shaft includes a shaft main body and a shaft flange extending radially outward from a lower end of the shaft main body. An inner peripheral surface of the sleeve includes a first inner peripheral surface that faces an outer peripheral surface of the shaft main body in the radial direction and a second inner peripheral surface that faces an outer peripheral surface of the shaft flange in the radial direction. The sleeve includes a sleeve inner lower surface and a circulation hole.

18 Claims, 11 Drawing Sheets

(56) References Cited

U.S. PATENT DOCUMENTS

| | | | | |
|---|---|---|---|---|
| 8,169,738 B1* | 5/2012 | Yawata | ............... | F16C 33/1085 |
| | | | | 360/99.08 |
| 8,534,919 B2* | 9/2013 | Le | ......................... | F16C 33/107 |
| | | | | 384/107 |
| 2008/0273822 A1* | 11/2008 | Le | ........................ | F16C 33/107 |
| | | | | 384/107 |
| 2012/0013213 A1* | 1/2012 | Kim | ...................... | F16C 17/107 |
| | | | | 310/90 |
| 2013/0033782 A1* | 2/2013 | Park | ....................... | H02K 1/187 |
| | | | | 360/75 |
| 2013/0140961 A1* | 6/2013 | Kim | ...................... | H02K 15/14 |
| | | | | 310/40 R |

* cited by examiner

FLUID DYNAMIC BEARING DEVICE, MOTOR, AND DISK DRIVE DEVICE

CROSS REFERENCE TO RELATED APPLICATION

The present invention claims priority under 35 U.S.C. § 119 to Japanese Application No. 2018-125316 filed on Jun. 29, 2018, the entire contents of which are incorporated herein by reference.

FIELD OF THE INVENTION

The present disclosure relates to a fluid dynamic bearing device, a motor, and a disk drive device.

BACKGROUND

A hard disk device or an optical disk device is mounted with a motor for rotating a disk. For example, Japanese Patent Application Laid-Open No. 2004-52987 discloses a conventional motor. The motor in that application has a stationary member, a rotating member, and a dynamic pressure bearing. The dynamic pressure bearing rotatably supports the rotating member with respect to the stationary member via a lubricating oil. The lubricating oil has a full-fill structure, which means the lubricating oil is completely filled in a gap between a shaft of the rotating member and a sleeve of the stationary member. The dynamic pressure bearing has a radial dynamic pressure bearing portion and a thrust dynamic pressure bearing portion. The radial dynamic pressure bearing portion induces a fluid dynamic pressure in a radial direction on the lubricating oil on the radially inner side of the sleeve so as to support the shaft in the radial direction. The thrust dynamic pressure bearing portion induces a fluid dynamic pressure directed inward in the radial direction on the lubricating oil so as to support the shaft in a thrust direction from below. Further, an unbalance groove having a plurality of spiral grooves is formed above the radial dynamic pressure bearing portion (on an interface side of the lubricating oil). Thus, a pressure raising section is formed which induces a fluid dynamic pressure directed downward on the lubricating oil so as to increase the pressure level of the entire lubricating oil in the dynamic pressure bearing.

Meanwhile, the thrust dynamic pressure bearing portion has a pressure gradient that decreases toward an outer peripheral side, and the pressure at an outer peripheral part of the thrust dynamic pressure bearing portion is the lowest in the entire dynamic pressure bearing. Therefore, the motor disclosed in Japanese Patent Application Laid-Open No. 2004-52987 is further provided with, separately from the gap between the shaft and the sleeve, a bypass passage which is open at the position where the pressure becomes the lowest and at a boundary position between the radial dynamic pressure bearing portion and the unbalance groove. The lubricating oil circulates through the gap between the shaft and the sleeve and through the bypass passage. Thus, the pressure at the outer peripheral part of the thrust dynamic pressure bearing portion becomes equal to the pressure raised by the unbalance groove. As a result, generation of air bubbles in air dissolved in the lubricating oil due to an excessive decrease in the pressure of the lubricating oil can be prevented.

However, in the structure disclosed in Japanese Patent Application Laid-Open No. 2004-52987, the lubricating oil may stagnate on the radially outer side of an opening of the bypass passage in the vicinity of the outer peripheral part of the thrust dynamic pressure bearing portion. Under such a situation, when air bubbles are generated in the air dissolved in the lubricating oil due to a pressure change or the like, such air bubbles are less likely to be discharged to the outside of the dynamic pressure bearing. If air bubbles accumulate in the dynamic pressure bearing, the rotational accuracy of the motor may decrease.

SUMMARY

Example embodiments of the present disclosure provide structures capable of preventing stagnation of lubricating oil in fluid dynamic bearing devices.

A first example embodiment of the present disclosure provides a fluid dynamic bearing device including a shaft disposed along a center axis extending vertically, a sleeve including a through hole into which the shaft is inserted, the sleeve cylindrically extending in an axial direction around the shaft, a thruster disposed below the shaft in the axial direction to close an opening in a lower end of the sleeve, a plurality of dynamic pressure grooves defined in at least one of an outer peripheral surface of the shaft and an inner peripheral surface of the sleeve, and a lubricating oil present among the shaft, the sleeve, and the thruster. The shaft includes a shaft main body extending along the center axis in a columnar shape, and a shaft flange extending outward in a radial direction from a lower end of the shaft main body. The inner peripheral surface of the sleeve includes a first inner peripheral surface facing an outer peripheral surface of the shaft main body in the radial direction, and a second inner peripheral surface that at least partially faces an outer peripheral surface of the shaft flange in the radial direction. The sleeve includes a sleeve inner lower surface that connects a lower end of the first inner peripheral surface and an upper end of the second inner peripheral surface and that at least partially faces the shaft flange in the axial direction, and at least one circulation hole that passes through an inside of the sleeve and that is open in the sleeve inner lower surface. A radially outer end of a lower opening of the circulation hole is positioned above a radially inner end of the lower opening in the axial direction.

A second example embodiment of the present disclosure provides a fluid dynamic bearing device including a shaft disposed along a center axis extending vertically, a sleeve having a through hole into which the shaft is inserted, the sleeve cylindrically extending in an axial direction around the shaft, a thruster disposed below the shaft in the axial direction to close an opening in a lower end of the sleeve, a plurality of dynamic pressure grooves defined in at least one of an outer peripheral surface of the shaft and an inner peripheral surface of the sleeve, and a lubricating oil present among the shaft, the sleeve, and the thruster. The shaft includes a shaft main body extending along the center axis in a columnar shape, and a shaft flange extending outward in a radial direction from a lower end of the shaft main body. The inner peripheral surface of the sleeve includes a first inner peripheral surface facing an outer peripheral surface of the shaft main body in the radial direction, and a second inner peripheral surface that at least partially faces an outer peripheral surface of the shaft flange in the radial direction. The sleeve includes a sleeve inner lower surface that connects a lower end of the first inner peripheral surface and an upper end of the second inner peripheral surface and that at least partially faces the shaft flange in the axial direction, and at least one circulation hole that passes through an inside of the sleeve and that is open in the sleeve inner lower surface, and at least a portion of the second inner peripheral surface of the sleeve is an inclined surface extending downward in the axial direction, while being inclined radially outward, from a portion above the thruster in the axial direction and on a radially outer side of the lower opening of the circulation hole.

According to the first example embodiment of the present disclosure, the radially outer end of the lower opening of the circulation hole is preferably positioned above the radially inner end of the lower opening in the axial direction. Therefore, the lubricating oil on the radially outer side of the shaft flange easily flows toward the lower opening of the circulation hole. Thus, stagnation of the lubricating oil present on the radially outer side of the shaft flange is able to be prevented. As a result, even when air bubbles are generated in the air dissolved in the lubricating oil due to a pressure change or the like, such air bubbles are easily discharged to the outside of the fluid dynamic bearing device.

According to the second example embodiment of the present disclosure, at least a portion of the second inner peripheral surface of the sleeve is preferably an inclined surface extending downward in the axial direction, while being inclined radially outward, from a portion above the thruster in the axial direction and on a radially outer side of the lower opening of the circulation hole. Therefore, the lubricating oil on the radially outer side of the shaft flange easily moves along the inclined surface to the circulation hole. Thus, stagnation of the lubricating oil present on the radially outer side of the shaft flange is able to be prevented. As a result, even when air bubbles are generated in the air dissolved in the lubricating oil due to a pressure change or the like, such air bubbles are easily discharged to the outside of the fluid dynamic bearing device.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings. In the present application, a direction parallel to the center axis of a motor is referred to as an "axial direction", a direction perpendicular to the center axis of the motor is referred to as a "radial direction", and a direction along an arc about the center axis of the motor is referred to as a "circumferential direction". Further, in the present application, the axial direction is defined as the vertical direction and a side where a clamp for pressing a magnetic disk with respect to a stator is defined as an upper side, and on the basis of such definitions, shapes and positional relationships of respective components will be described. It should be noted, however, that the above definitions of the vertical direction and the upper side are not intended to restrict the orientation of a disk drive device according to the present disclosure when in use. Also note that the wording "parallel direction" as used herein includes substantially parallel directions. Also note that the wording "perpendicular direction" as used herein includes substantially perpendicular directions.

1. First Example Embodiment 1-1. Configuration of Disk Drive Device

Figure 1:
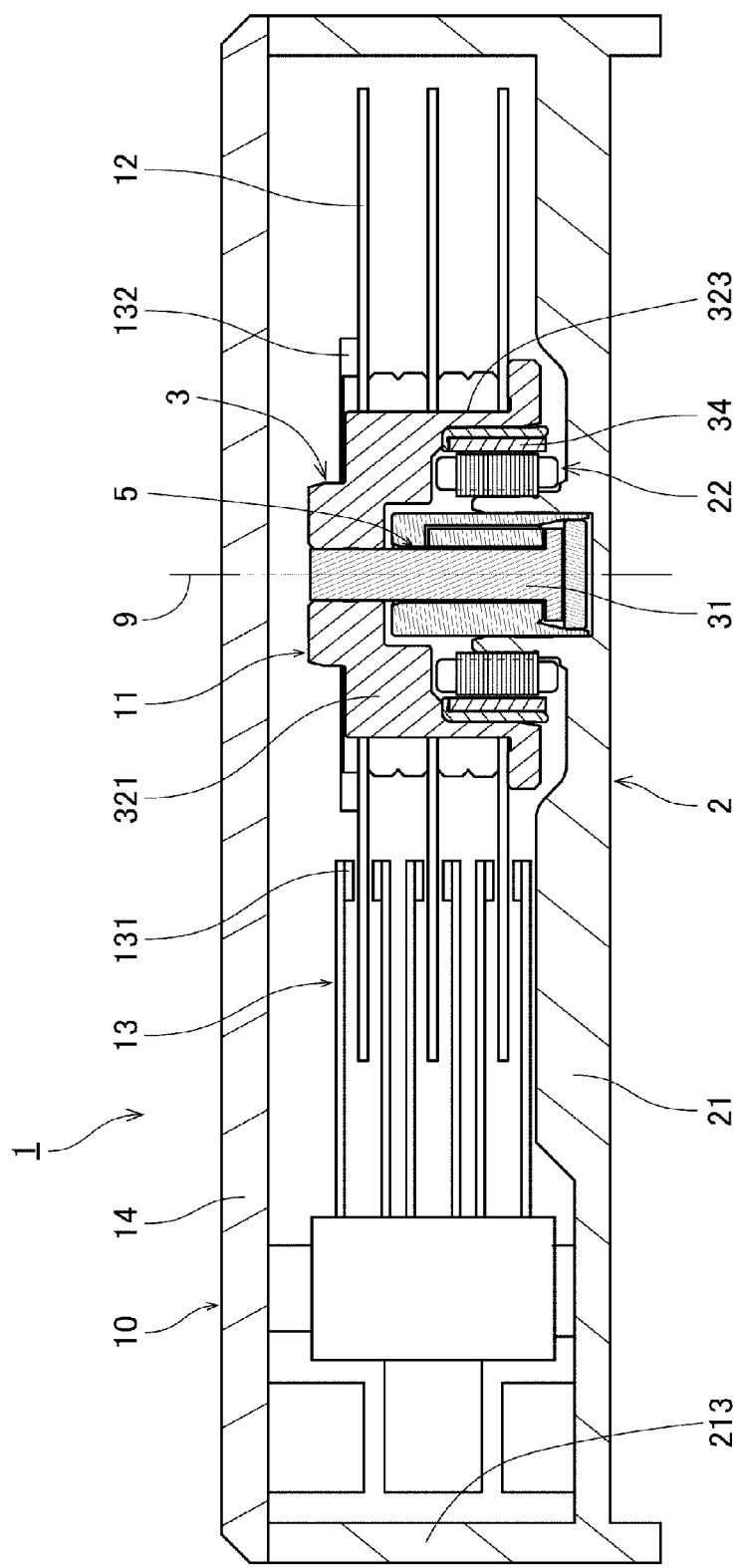
FIG. 1 is a longitudinal sectional view of a disk drive device according to a first example embodiment of the present disclosure.

FIG. 1 is a longitudinal sectional view of a disk drive device 1 according to a first example embodiment. The disk drive device 1 reads and writes information from or to a magnetic disk 12 which has a circular hole on its center, while rotating the magnetic disk 12. As illustrated in FIG. 1, the disk drive device 1 has a motor 11, three magnetic disks 12, an access section 13, and a cover 14 constituting a part of a housing 10.

The motor 11 rotates the magnetic disks 12 around a vertically extending center axis 9 while supporting the magnetic disks 12 by a rotary section 3 described later. The motor 11 has a base portion 21. A part of the base portion 21 extends in a radial direction below the magnetic disks 12. The rotary section 3 of the motor 11, the magnetic disks 12, and the access section 13 are housed in the housing 10 defined by the base portion 21 and the cover 14. The access section 13 moves heads 131 along recording surfaces of the magnetic disks 12 to carry out at least one of reading and writing information from and to the magnetic disks 12. Note that the disk drive device 1 may have one, two, or more than three magnetic disks 12.

Clean air having little dust or dirt is filled in an inner space of the housing 10. Note that, in place of air, helium gas, hydrogen gas, or nitrogen gas may be filled. As a result, the resistance of the gas to the access section 13 is reduced. Alternatively, a mixture of these gases and air may be filled. A joint area between the base portion 21 and the cover 14 is sealed with a sealant such as an elastomer. Thus, the inner space of the housing 10 is kept airtight.

1-2. Configuration of Motor

Figure 2:
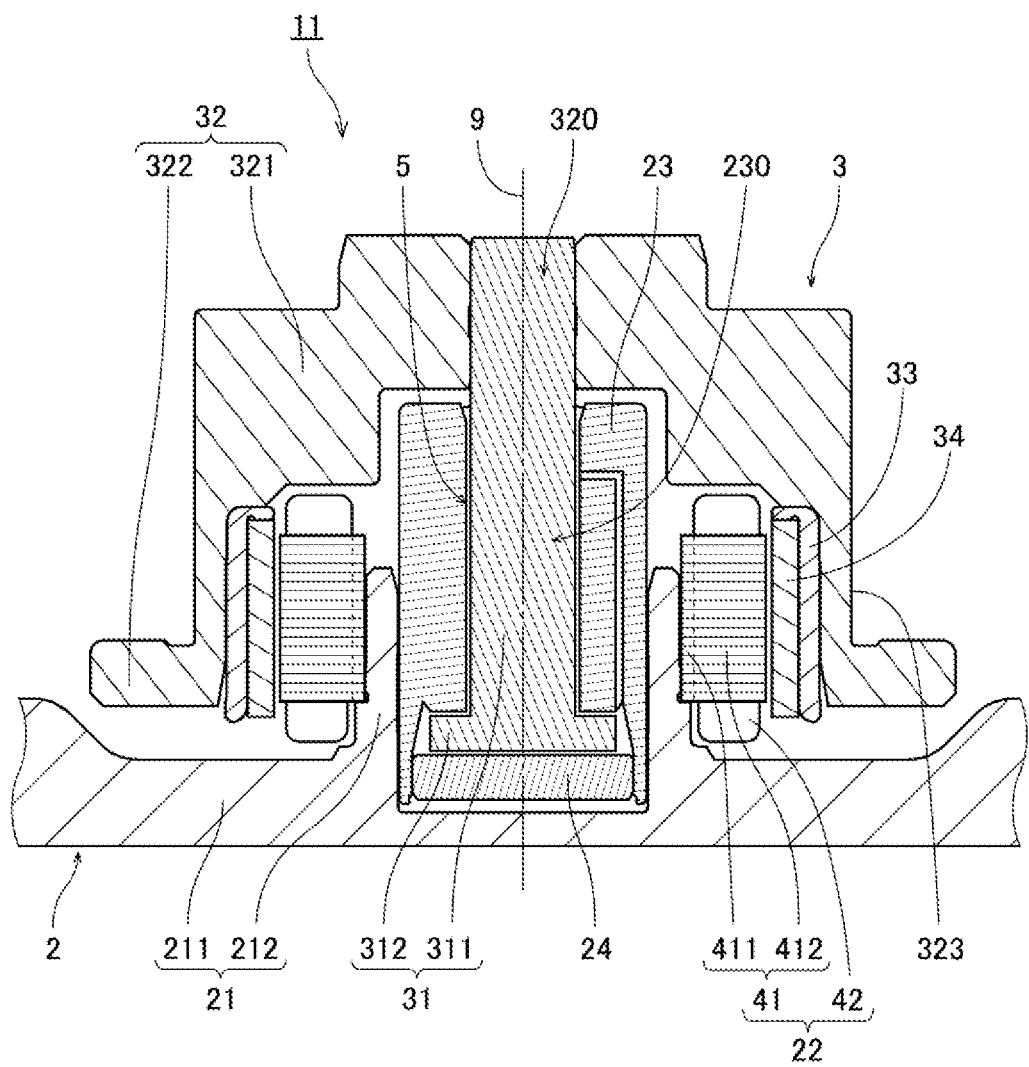
FIG. 2 is a longitudinal sectional view of a motor according to the first example embodiment of the present disclosure.

Next, the configuration of the motor 11 will be described in detail. FIG. 2 is a longitudinal sectional view of the motor 11 according to the first example embodiment. As illustrated in FIG. 2, the motor 11 has a stationary section 2, the rotary section 3, and a fluid dynamic bearing device 5 to be described later. The stationary section 2 is stationary relative to the housing 10 of the disk drive device 1. The rotary section 3 is supported so as to be rotatable about the center axis 9 with respect to the stationary section 2 via the fluid dynamic bearing device 5.

The stationary section 2 in the present example embodiment has the base portion 21, a stator 22, a sleeve 23, and a thruster 24. The sleeve 23 and the thruster 24 are included in the stationary section 2 and constitute a part of the fluid dynamic bearing device 5.

The base portion 21 supports the stator 22. A material of the base portion 21 is, for example, metal such as aluminum alloy or stainless steel. The base portion 21 has a base bottom plate 211, a base cylindrical part 212, and a base side wall 213 (see FIG. 1). The base bottom plate 211, the base cylindrical part 212, and the base side wall 213 are integrally formed.

The base bottom plate 211 extends perpendicularly to the central axis 9 below the rotary section 3 and the magnetic disks (see FIG. 1). Further, a circuit board (not illustrated) for supplying a drive current to the motor 11 is disposed on the base bottom plate 211 in the present example embodiment. The base cylindrical part 212 extends substantially cylindrically upward from a part of an upper surface of the base bottom plate 211. The base cylindrical part 212 is also disposed substantially coaxially with the center axis 9. The base side wall 213 extends in the axial direction on a radially outer side of the rotary section 3, the magnetic disks 12, and the access section 13. An upper end of the base side wall 213 is fixed to a lower surface of a radially outer end of the cover 14.

The stator 22 is an armature having a stator core 41 and a plurality of coils 42. The stator 22 is positioned above the base bottom plate 211 and radially outward of the base cylindrical part 212. The stator core 41 is formed from, for example, a laminated steel plate obtained by laminating electromagnetic steel plates such as silicon steel plates in the axial direction. The stator core 41 is fixed to an outer peripheral surface of the base cylindrical part 212 with, for example, an adhesive, and thus, is directly supported on the base portion 21. The stator core 41 may be indirectly supported on the base portion 21 via a separate member.

The stator core 41 has an annular core back 411 and a plurality of teeth 412 protruding radially outward from the core back 411. The plurality of coils 42 is an aggregate of wires wound around the plurality of teeth 412. The drive current of the motor 11 is supplied from an external power source (not shown) to the coils 42 via the circuit board and the wires. The plurality of teeth 412 and the plurality of coils 42 are preferably annularly arranged in a circumferential direction around the center axis 9 at substantially equal intervals.

The sleeve 23 is a member substantially cylindrically extending in the axial direction around a later-described shaft 31 of the rotary section 3. A lower part of the sleeve 23 is fixed to an inner peripheral surface of the base cylindrical part 212 by, for example, bonding. Further, a sleeve through hole 230 is formed in the sleeve 23 around the center axis 9 on a radially inner side. The sleeve through hole 230 penetrates the sleeve 23 in the axial direction. The shaft 31 is inserted in the sleeve through hole 230 in the axial direction.

The thruster 24 is a disk-shaped member disposed below the later-described shaft 31 of the rotary section 3 so as to close an opening at a lower end of the sleeve 23. An outer peripheral surface of the thruster 24 is fixed to an inner peripheral surface (a second inner peripheral surface 62 described later) of the sleeve 23 in the vicinity of the lower end of the sleeve 23 by, for example, press fitting and bonding. During a manufacturing process of the motor 11, the shaft 31 is firstly inserted radially inward into the sleeve 23, and then, the outer peripheral surface of the thruster 24 is press-fitted to the inner peripheral surface of the sleeve 23 from below. At that time, an adhesive 25 (see FIG. 6 described later) is applied in advance to the inner peripheral surface of the sleeve 23 in the vicinity of the lower end. As the thruster 24 is press-fitted, the adhesive 25 spreads to the inner peripheral surface of the sleeve 23 and the outer peripheral surface of the thruster 24. Further, a portion of the adhesive 25 is pushed upward from the thruster 24. It is to be noted that the outer peripheral surface of the thruster 24 may be fixed to the inner peripheral surface of the sleeve 23 only by press fitting or bonding, or may be fixed by another method such as shrinkage fitting or welding.

The rotary section 3 according to the present example embodiment has the shaft 31, a rotor hub 32, a yoke 33, and a magnet 34. The shaft 31 is included in the rotary section 3 and constitutes a part of the fluid dynamic bearing device 5.

The shaft 31 is a member disposed along the center axis 9 and extending in the axial direction on the radially inner side of the sleeve 23 and the rotor hub 32. A material of the shaft 31 is, for example, metal such as stainless steel. In addition, the material of the shaft 31 may be magnetic or non-magnetic. Furthermore, the shaft 31 may be integrated with the rotor hub 32 or may be a separate member from the rotor hub 32.

The shaft 31 includes a shaft main body 311 and a shaft flange 312, and has a T-shape in cross-section. The shaft main body 311 extends along the center axis 9 in a columnar shape. The shaft flange 312 extends radially outward from a lower end of the shaft main body 311. The outer peripheral surface of the thruster 24 is positioned further outward than an outer peripheral surface of the shaft flange 312 in the radial direction. This configuration can prevent the adhesive 25 for fixing the thruster 24 to the sleeve 23 from adhering to the shaft 31 and interfering with the rotation.

The rotor hub 32 is a member annularly extending around the shaft 31. The rotor hub 32 has a hub annular part 321 and a hub flange 322. The hub annular part 321 and the hub flange 322 are integrally formed.

The hub annular part 321 is fixed to an outer peripheral surface of the shaft 31 in the vicinity of an upper end of the shaft 31. The hub annular part 321 annularly extends radially outward above the stator 22 and the sleeve 23 in the axial direction and further extends cylindrically in the axial direction about the center axis 9 around the stator 22. An upper surface of the sleeve 23 faces a lower surface of the hub annular part 321 in the axial direction with a gap therebetween. A hub through hole 320 is formed around the center axis 9 on the radially inner side of the hub annular part 321. The hub through hole 320 penetrates the hub annular part 321 in the axial direction. The upper end of the shaft 31 is fixed to the hub through hole 320 by press-fitting. The outer peripheral surface of the shaft 31 near the upper end may be further fixed to the inner peripheral surface of the hub annular part 321 by bonding. The outer peripheral surface of the shaft 31 near the upper end may be fixed to the inner peripheral surface of the hub annular part 321 only by bonding, or may be fixed by another method such as shrinkage fitting.

As illustrated in FIG. 1, an outer peripheral surface 323 of the hub annular part 321 fits into the circular holes of the magnetic disks 12. At least a portion of an inner periphery of each magnetic disk 12 is in contact with the outer peripheral surface 323 of the hub annular part 321. Thus, the magnetic disks 12 are supported by the rotary section 3 including the hub annular part 321, while being positioned in the radial direction. Further, a clamp 132 for pressing the magnetic disks 12 is fixed to an upper surface of the hub annular part 321.

The hub flange 322 extends radially outward from a lower end of the outer peripheral portion of the hub annular part 321. The magnetic disks 12 are disposed above the hub flange 322. A lower surface of the lowermost one of the magnetic disks 12 is in contact with at least a part of an upper surface of the hub flange 322. Thus, the magnetic disks 12 are supported by the rotary section 3 including the hub flange 322, while being positioned in the axial direction.

The yoke 33 is a cylindrical member for holding the magnet 34. The yoke 33 is disposed substantially coaxially with the center axis 9. Further, an outer peripheral surface of the yoke 33 is fixed to an inner peripheral surface of a lower part of the hub annular part 321 by, for example, bonding. A ferromagnetic material such as iron is used for a material of the yoke 33. With this configuration, leakage of a magnetic flux generated from the magnet 34 to the outside can be suppressed.

The magnet 34 is a member annularly arranged in the axial direction around the center axis 9. An outer peripheral surface of the magnet 34 is fixed to an inner peripheral surface of the yoke 33 by, for example, an adhesive. An inner peripheral surface of the magnet 34 radially faces radially outer end faces of the plurality of teeth 412 of the stator 22 with a small gap therebetween. An annular permanent magnet is used for the magnet 34 in the present example embodiment. In addition, north and south poles are arranged alternately in the circumferential direction on the inner peripheral surface of the magnet 34. Note that a plurality of magnets may be used in place of the annular magnet 34. In that case, a plurality of magnets may be disposed on the inner peripheral surface of the yoke 33 so that magnetic pole surfaces of north poles and magnetic pole surfaces of south poles are arranged alternately in the circumferential direction. The magnet 34 in the present example embodiment is indirectly fixed to the rotor hub 32 via the yoke 33 as described above. However, the magnet 34 may be directly fixed to the rotor hub 32 without using the yoke 33.

In the motor 11 thus configured, when a drive current is supplied to the coil 42 via the circuit board, a magnetic flux is generated at each of the teeth 412. Then, due to interaction between the magnetic flux of the teeth 412 and magnetic flux of the magnet 34, a circumferential torque is generated between the stationary section 2 and the rotary section 3.

As a result, the rotary section 3 rotates about the center axis 9 relative to the stationary section 2. Further, the magnetic disks 12 mounted on the rotor hub 32 rotate about the center axis 9 together with the rotary section 3.

1-3. Configuration of Fluid Dynamic Bearing Device

Subsequently, the configuration of the fluid dynamic bearing device 5 will be described. In the following description, FIGS. 1 and 2 are referred to, as appropriate, as well as FIGS. 3 to 5 to be described later.

Figure 3:
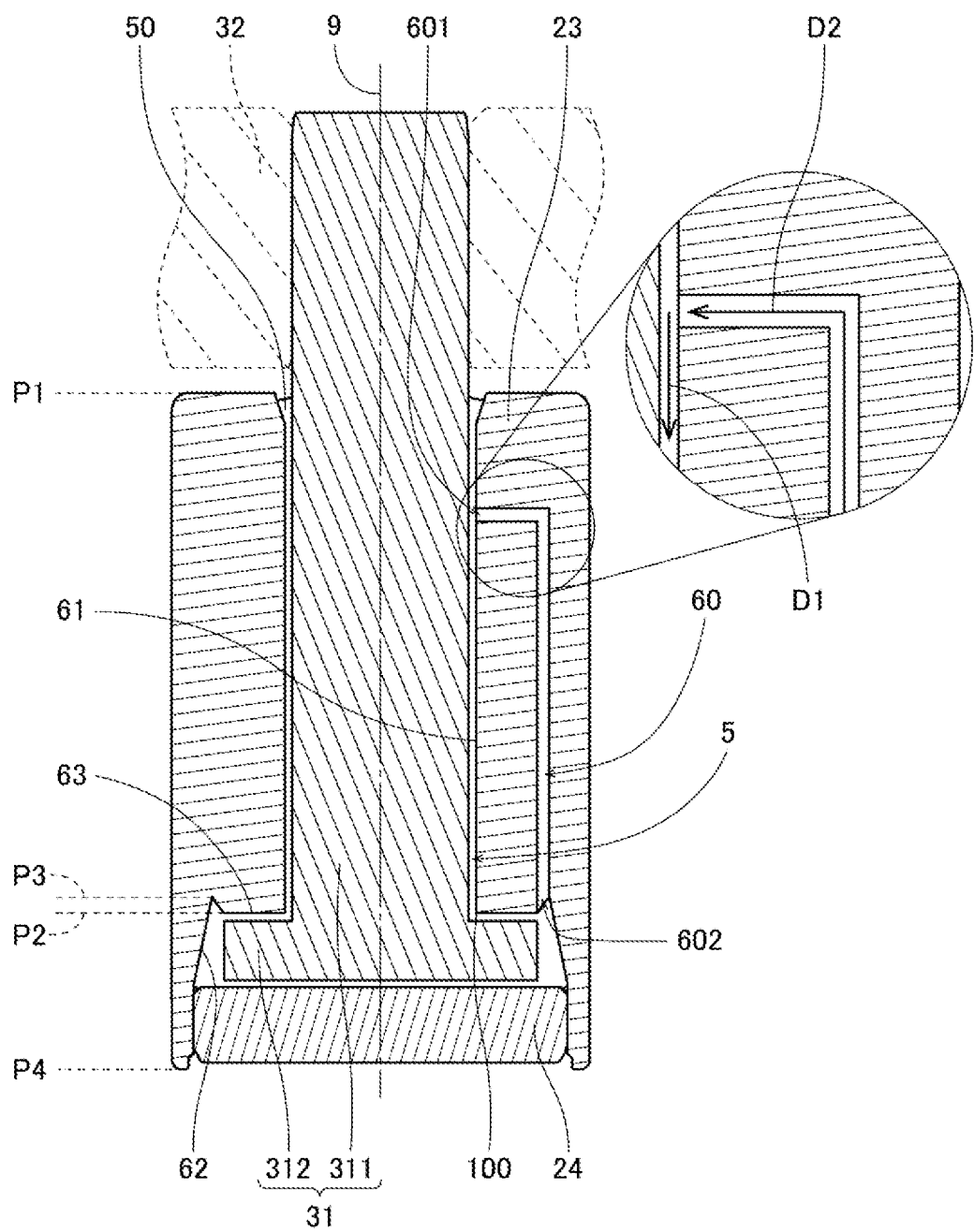
FIG. 3 is a longitudinal sectional view of a shaft, a sleeve, and a thruster according to the first example embodiment of the present disclosure.

FIG. 3 is a longitudinal sectional view of the shaft 31, the sleeve 23, and the thruster 24. As illustrated in FIG. 3, the inner peripheral surface of the sleeve 23 has a stepped part corresponding to the T shape of the shaft 31. In the following description, an area of the inner peripheral surface of the sleeve 23 extending axially upward from a corner 100 of the stepped part (a continuous surface extending in the axial direction from a position P1 to a position P2 in FIG. 3) is defined as a first inner peripheral surface 61. Further, an area of the inner peripheral surface of the sleeve 23 axially extending from a position above the thruster 24 in the axial direction to a position on the radially outer side of the thruster 24 (a continuous surface extending in the axial direction from a position P3 to a position P4 in FIG. 3) is defined as a second inner peripheral surface 62. Further, a surface of the sleeve 23 connecting a lower end of the first inner peripheral surface 61 and an upper end of the second inner peripheral surface 62 is defined as a sleeve inner lower surface 63. The first inner peripheral surface 61 radially faces the outer peripheral surface of the shaft main body 311 with a small gap therebetween. At least a part of the second inner peripheral surface 62 radially faces the outer peripheral surface of the shaft flange 312 with a small gap therebetween. At least a part of the sleeve inner lower surface 63 on the radially inner side faces an upper surface of the shaft flange 312 in the axial direction with a small gap therebetween. Further, a lower surface of the shaft flange 312 faces an upper surface of the thruster 24 in the axial direction with a small gap therebetween.

A circulation hole 60 is provided in a part of the sleeve in the circumferential direction. The circulation hole 60 passes through the inside of the sleeve 23. Both ends of the circulation hole 60 open in the first inner peripheral surface 61 and the sleeve inner lower surface 63, respectively. In the following description, the opening of the circulation hole 60 in the first inner peripheral surface 61 is defined as an upper opening 601. The opening of the circulation hole 60 in the sleeve inner lower surface 63 is defined as a lower opening 602. In the present example embodiment, three circulation holes 60 are provided at equal intervals in the circumferential direction of the sleeve 23. It is to be noted that at least one circulation hole 60 may be provided in the sleeve 23, and the number of the circulation holes 60 is not limited to three.

A lubricating oil 50 is interposed in the gap among the shaft 31, the sleeve 23, and the thruster 24. A polyester oil or a diester oil is used as the lubricating oil 50, for example. The interface of the lubricating oil 50 is positioned in the radial gap between the first inner peripheral surface 61 of the sleeve 23 in the vicinity of the upper end of the sleeve 23 and the outer peripheral surface of the shaft main body 311.

Figure 4:
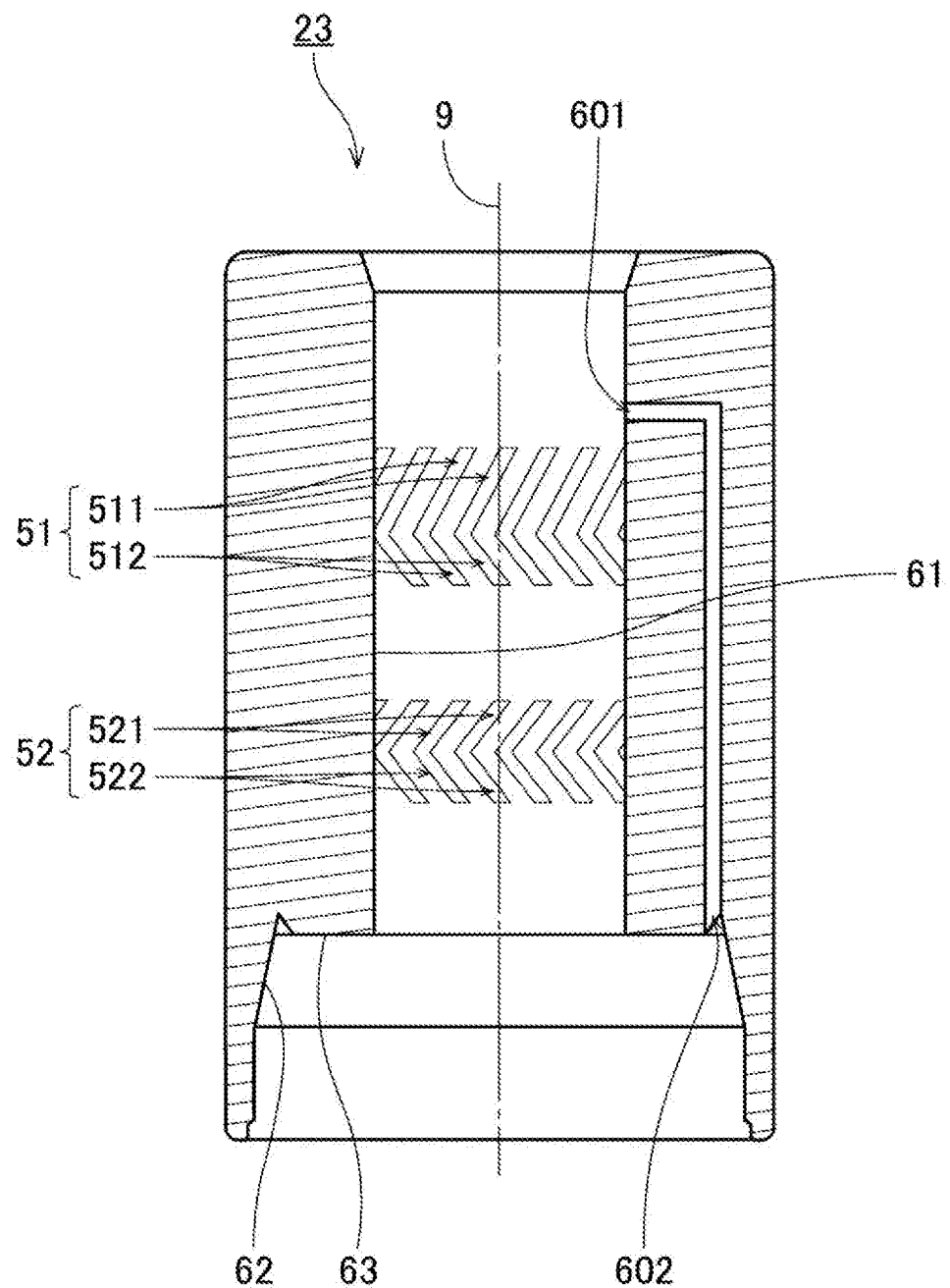
FIG. 4 is a longitudinal sectional view of the sleeve according to the first example embodiment of the present disclosure.

FIG. 4 is a longitudinal sectional view of the sleeve 23. As illustrated in FIG. 4, the first inner peripheral surface 61 is formed with an upper radial dynamic pressure groove array 51 and a lower radial dynamic pressure groove array 52. The upper radial dynamic pressure groove array 51 is positioned axially above the lower radial dynamic pressure groove array 52. The upper and lower radial dynamic pressure groove arrays 51 and 52 are dynamic pressure groove arrays in a so-called herringbone pattern. Further, in the upper radial dynamic pressure groove array 51, a plurality of axially upper dynamic pressure grooves 511 is inclined toward one side in the circumferential direction, as they extend downward. In the upper radial dynamic pressure groove array 51, a plurality of axially lower dynamic pressure grooves 512 is inclined toward one side in the circumferential direction, as they extend upward. In the lower radial dynamic pressure groove array 52, a plurality of axially upper dynamic pressure grooves 521 is inclined toward one side in the circumferential direction, as they extend downward. In the lower radial dynamic pressure groove array 52, a plurality of axially lower dynamic pressure grooves 522 is inclined toward one side in the circumferential direction, as they extend upward.

While the motor 11 is running, the upper and lower radial dynamic pressure groove arrays 51 and 52 induce a dynamic pressure on the lubricating oil 50 which is present between the first inner peripheral surface 61 of the sleeve 23 and the outer peripheral surface of the shaft main body 311. This produces a radial supporting force between the sleeve 23 and the shaft 31. Note that each of the upper and lower radial dynamic pressure groove arrays 51 and 52 may be formed in the inner peripheral surface of the sleeve 23 and/or the outer peripheral surface of the shaft 31. Also note that the number of radial dynamic pressure groove arrays may be one or more than two.

Further, in the present example embodiment, in the upper radial dynamic pressure groove array 51, the plurality of axially upper dynamic pressure grooves 511 is longer than the plurality of axially lower dynamic pressure grooves 512. Thus, while the motor 11 is running, a pressure (hereinafter referred to as a "pushing pressure") for pushing the lubricating oil 50 from top (that is, from the interface side of the lubricating oil 50) to bottom in the axial direction is generated between the first inner peripheral surface 61 of the sleeve 23 and the outer peripheral surface of the shaft main body 311 by the upper radial dynamic pressure groove array 51.

Figure 5:
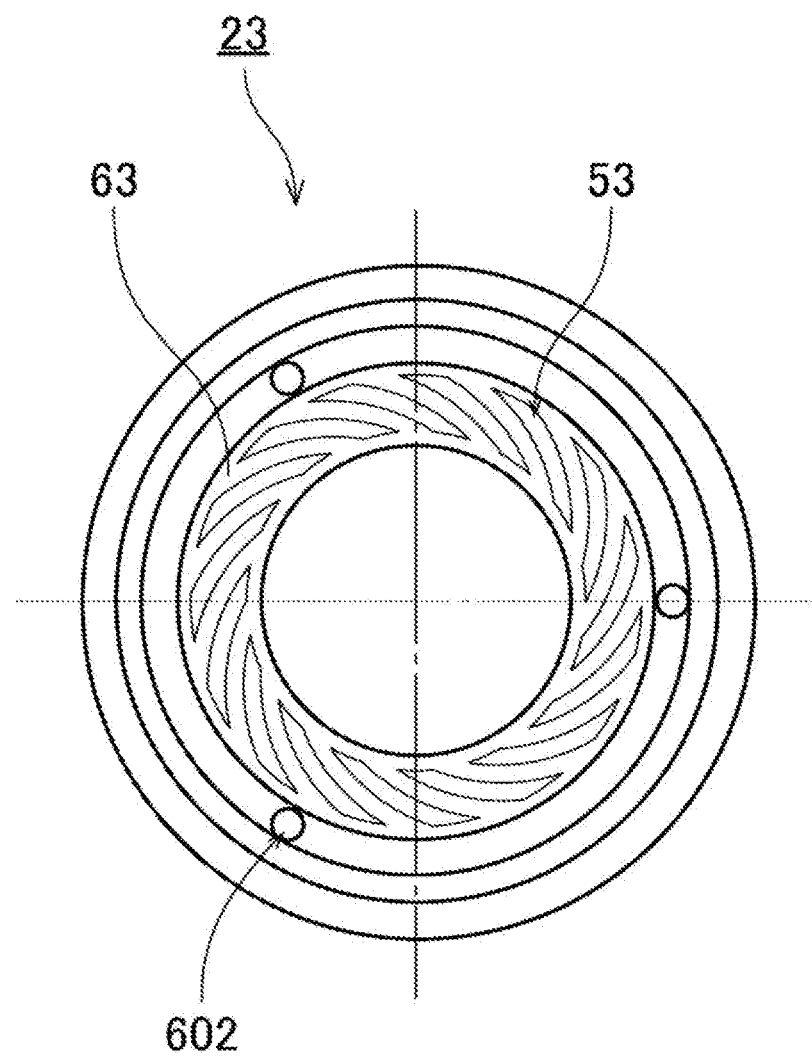
FIG. 5 is a bottom view of the sleeve according to the first example embodiment of the present disclosure.

FIG. 5 is a bottom view of the sleeve 23. As illustrated in FIG. 5, a thrust dynamic pressure groove array 53 is formed in the sleeve inner lower surface 63. The thrust dynamic pressure groove array 53 has a plurality of thrust grooves arrayed in the circumferential direction. The thrust grooves spirally extend from the radially inner side toward the radially outer side. Note that the thrust dynamic pressure groove array 53 may be formed in a herringbone pattern. When the motor 11 is running, a fluid dynamic pressure is induced on the lubricating oil 50 present between the sleeve inner lower surface 63 and the upper surface of the shaft flange 312 by the thrust dynamic pressure groove array 53. This produces an axial supporting force between the sleeve 23 and the shaft 31, whereby the rotation of the rotary section 3 is stabilized.

A thrust dynamic pressure groove array may be further formed in the upper surface of the thruster 24. While the motor is running, a fluid dynamic pressure may be induced on the lubricating oil 50 present between the upper surface of the thruster 24 and the lower surface of the shaft flange 312 by the thrust dynamic pressure groove array. Thus, the rotation of the rotary section 3 with respect to the sleeve 23 is further stabilized.

That is, in the present example embodiment, the fluid dynamic bearing device 5 is constituted by the sleeve 23 and the thruster 24 which are included in the stationary section 2, the shaft 31 which is included in the rotary section 3, the plurality of dynamic pressure grooves, and the lubricating oil 50.

It is to be noted that the lubricating oil 50 is continuously present in the radial gap between the first inner peripheral surface 61 of the sleeve 23 and the outer peripheral surface of the shaft main body 311, the axial gap between the sleeve inner lower surface 63 of the sleeve 23 and the upper surface of the shaft flange 312, the radial gap between a part of the second inner peripheral surface 62 of the sleeve 23 and the outer peripheral surface of the shaft flange 312, the axial gap between the lower surface of the shaft flange 312 and the upper surface of the thruster 24, and the circulation holes 60. In other words, the fluid dynamic bearing device 5 has a so-called full-fill structure in which the lubricating oil 50 is continuously present in the gap between the stationary section 2 and the rotary section 3. As a result, even when an impact is applied during rotation of the motor 11, contact between the stationary section 2 and the rotary section 3 can be prevented.

Further, due to the "pushing pressure", the lubricating oil 50 circulates through the gap among the shaft 31, the sleeve 23, and the thruster 24 and through the circulation holes 60. Specifically, as indicated by an arrow D1 in FIG. 3, the lubricating oil 50 flows mainly downward in the axial direction in the gap between the first inner peripheral surface 61 of the sleeve 23 and the outer peripheral surface of the shaft main body 311. As indicated by an arrow D2 in FIG. 3, the lubricating oil 50 flows through the circulation holes 60 from the lower openings 602 toward the upper openings 601. Even when air bubbles are generated in the air dissolved in the lubricating oil 50, such air bubbles flow toward the vicinity of the interface of the lubricating oil 50 through the circulation holes 60 due to the circulation of the lubricating oil 50. Therefore, the air bubbles can be discharged from the interface of the lubricating oil 50 to the outside of the fluid dynamic bearing device 5.

1-4. Detailed Configuration of Shaft, Sleeve, and Thruster

Figure 6:
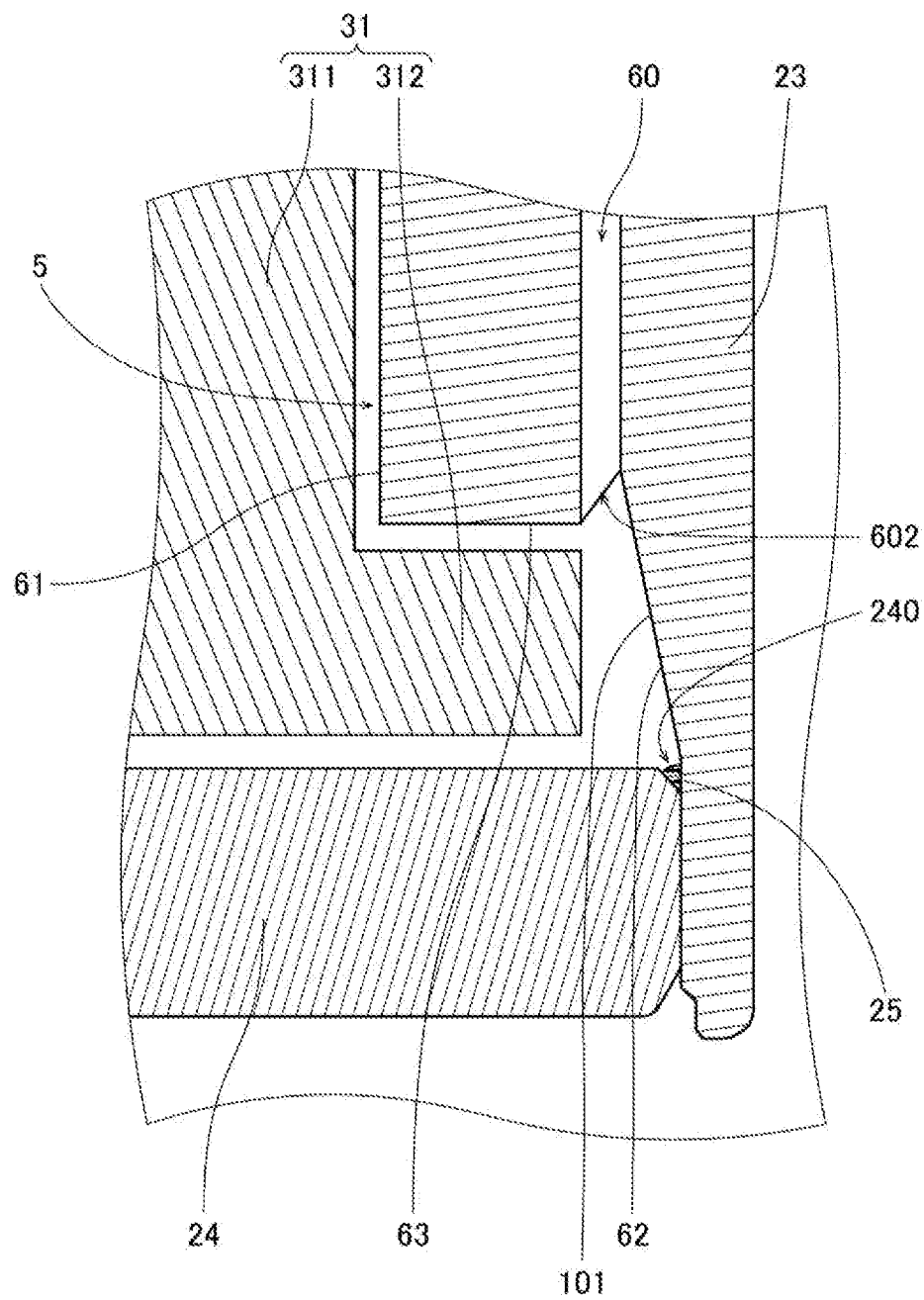
FIG. 6 is a partial longitudinal sectional view of the shaft, the sleeve, and the thruster according to the first example embodiment of the present disclosure.

Subsequently, configurations of the shaft 31, the sleeve 23, and the thruster 24 will be described in more detail. FIG. 6 is a partial longitudinal sectional view of the shaft 31, the sleeve 23, and the thruster 24. In the following description, FIGS. 1 to 5 are referred to, as appropriate, as well as FIG. 6.

In the present example embodiment, each of the lower openings 602 formed in the sleeve inner lower surface 63 opens obliquely in relation to the axial direction and the radial direction. A radially outer end of the lower opening 602 is positioned above a radially inner end of the lower opening 602 in the axial direction. With this configuration, the lubricating oil 50 on the radially outer side of the shaft flange 312 easily flows toward the lower opening 602 of the circulation hole 60. On the other hand, if such a structure is not provided, the lubricating oil 50 on the radially outer side of the shaft flange 312 is less likely to flow toward the lower opening 602 of the circulation hole 60 and is likely to stagnate. Therefore, when air bubbles are generated in the air dissolved in the lubricating oil 50 on the radially outer side of the shaft flange 312, such air bubbles are less likely to be discharged to the outside of the fluid dynamic bearing device 5 through the circulation hole 60. The present disclosure has the abovementioned structure, and thus, can prevent stagnation of the lubricating oil 50 present on the radially outer side of the shaft flange 312. As a result, even when air bubbles are generated in the air dissolved in the lubricating oil 50 due to a pressure change or the like, such air bubbles are easily discharged to the outside of the fluid dynamic bearing device 5.

As illustrated in FIG. 6, an inclined surface 101 is formed on at least a part of the second inner peripheral surface 62 of the sleeve 23. The inclined surface 101 extends downward in the axial direction, while being inclined radially outward, from a portion axially above the thruster 24 and on the radially outer side of the lower opening 602. Therefore, the lubricating oil 50 on the radially outer side of the shaft flange 312 easily moves along the inclined surface 101 to the circulation hole 60. Thus, stagnation of the lubricating oil 50 present on the radially outer side of the shaft flange 312 can be prevented. As a result, even when air bubbles are generated in the air dissolved in the lubricating oil 50 due to a pressure change or the like, such air bubbles are easily discharged to the outside of the fluid dynamic bearing device 5.

Further, in the present example embodiment, a radially inner end of the inclined surface 101 is preferably positioned above the radially inner end of the lower opening 602 in the axial direction. With this configuration, the lubricating oil 50 moving along the inclined surface 101 is more easily guided to the circulation hole 60. As a result, stagnation of the lubricating oil 50 present on the radially outer side of the shaft flange 312 can be further prevented.

In addition, the thruster 24 has a recess 240 recessed downward from the upper surface in a part including the radially outer end. During the manufacturing process of the motor 11, the thruster 24 is press-fitted to the lower end of the sleeve 23. At this time, a portion of the adhesive 25 for fixing the thruster 24 to the sleeve 23 is pushed upward from the thruster 24 and accumulated in at least a part of the recess 240. Further, at least a portion of the adhesive 25 is continuously arranged over the upper surface of the thruster 24 and the second inner peripheral surface 62. Accordingly, the space where the lubricating oil 50 on the radially outer side of the shaft flange 312 is particularly liable to stagnate is covered with the adhesive 25, whereby the stagnation of the lubricating oil 50 can be further prevented.

Further, the recess 240 functions as an adhesive accommodating portion for accommodating the adhesive 25 in a radial gap between a part of the thruster 24 including the upper end of the outer peripheral surface of the thruster 24 and the second inner peripheral surface 62 of the sleeve 23. This configuration can prevent the adhesive 25 from protruding to the shaft 31 side and interfering with the rotation of the shaft 31.

2. Second Example Embodiment

Subsequently, the configuration of a disk drive device according to a second example embodiment of the present disclosure will be described. It is to be noted that portions of the disk drive device according to the second example embodiment other than a motor 11B are the same in structure as those of the disk drive device 1 according to the first example embodiment other than the motor 11, and therefore, a redundant description will be omitted.

Figure 7:
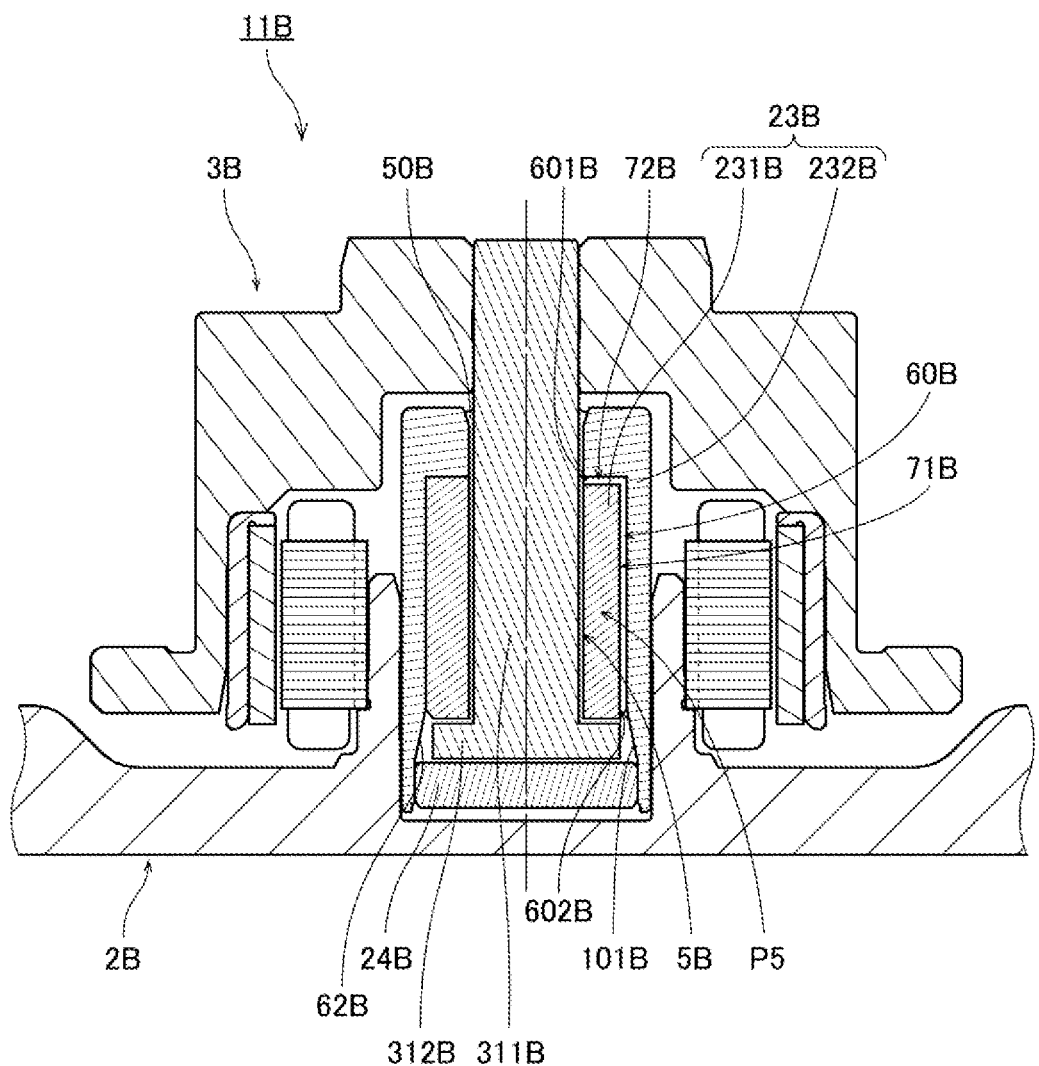
FIG. 7 is a longitudinal sectional view of a motor according to a second example embodiment of the present disclosure.

FIG. 7 is a longitudinal sectional view of the motor 11B according to the second example embodiment. The motor 11B includes a stationary section 2B, a rotary section 3B, and a fluid dynamic bearing device 5B. The portions of the motor 11B other than a sleeve 23B are the same in structure as those of the motor 11 according to the first example embodiment other than the sleeve 23.

The sleeve 23B in the present example embodiment further includes an inner sleeve 231B and an outer sleeve 232B. The inner sleeve 231B is included in an area of the sleeve 23B located above a shaft flange 312B, and is located axially below an upper opening 601B. The inner sleeve 231B cylindrically extends in the axial direction above the shaft flange 312B and on the radially outer side of a shaft main body 311B. The outer sleeve 232B is a portion positioned above the inner sleeve 231B and on the radially outer side of the inner sleeve 231B. The outer sleeve 232B defines at least an outer periphery and a lower end of the sleeve 23B. In the present example embodiment, the inner sleeve 231B and the outer sleeve 232B are different members. A part of an outer peripheral surface of the inner sleeve 231B in the circumferential direction is fixed to an inner peripheral surface of the outer sleeve 232B by bonding.

Figure 8:
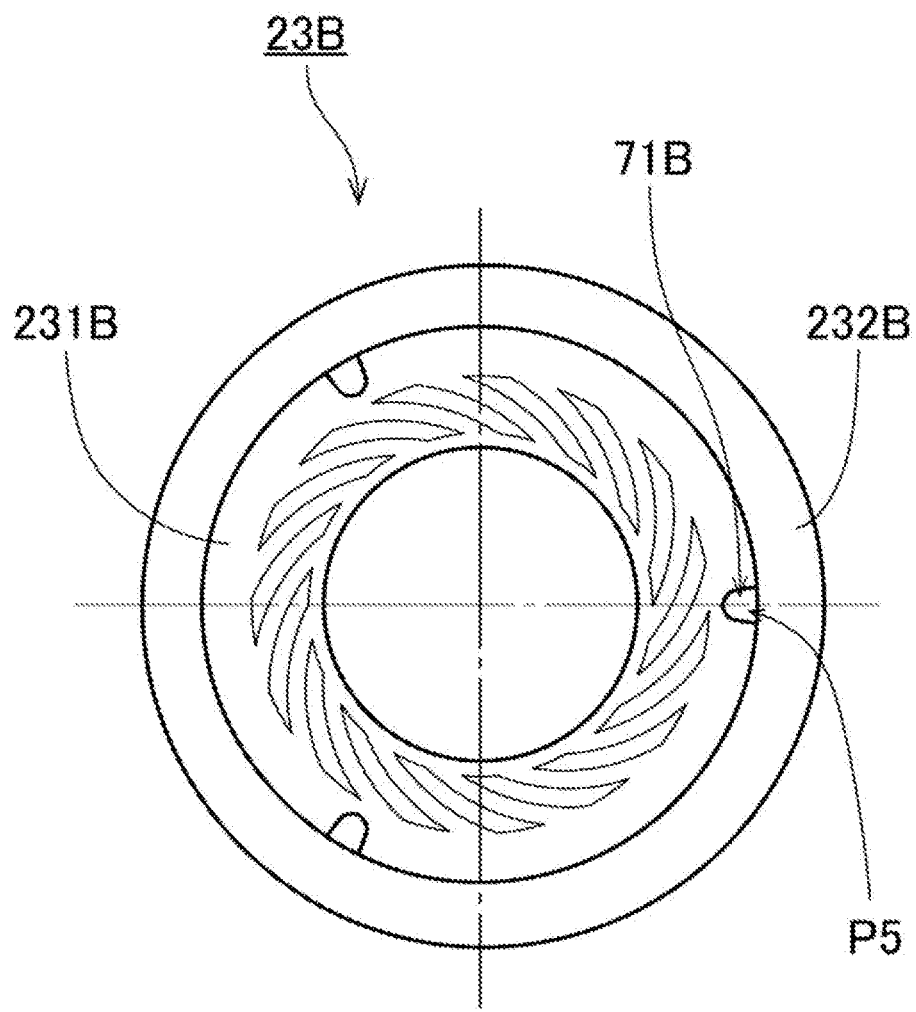
FIG. 8 is a bottom view of a sleeve according to the second example embodiment of the present disclosure.

FIG. 8 is a bottom view of the sleeve 23B. As illustrated in FIG. 8, a part of the outer peripheral surface of the inner sleeve 231B is recessed radially inward from an upper end to a lower end at a position P5 in the circumferential direction. Thus, a part of the outer peripheral surface of the inner sleeve 231B radially faces the inner peripheral surface of the outer sleeve 232B at the position P5 with a gap 71B therebetween. As illustrated in FIG. 7, a part of the upper surface of the inner sleeve 231B is recessed downward in the axial direction from the radially inner end to the radially outer end at the position P5 in the circumferential direction. As a result, a part of the upper surface of the inner sleeve 231B faces a lower surface of the outer sleeve 232B in the axial direction at the position P5 with a gap 72B therebetween. Further, the gap 71B and the gap 72B are communicated with each other, so that a circulation hole 60B is formed between the inner sleeve 231B and the outer sleeve 232B. A lower opening 602B of the circulation hole 60B is formed in a radial gap between the lower end of the outer peripheral surface of the inner sleeve 231B and the lower end of the inner peripheral surface of the outer sleeve 232B. In this way, the circulation hole 60B can be easily provided by constructing the sleeve 23B using the inner sleeve 231B and the outer sleeve 232B which are different from each other.

A second inner peripheral surface 62B in the present example embodiment is formed on the inner peripheral surface of the outer sleeve 232B. As in the first example embodiment, an inclined surface 101B is formed on at least a part of the second inner peripheral surface 62B. The inclined surface 101B extends downward in the axial direction, while being inclined radially outward, from a portion axially above a thruster 24B and on the radially outer side of the lower opening 602B. Thus, a lubricating oil 50B on the radially outer side of the shaft flange 312B easily moves along the inclined surface 101B to the circulation hole 60B. As a result, stagnation of the lubricating oil 50B present on the radially outer side of the shaft flange 312B can be prevented.

As in the first example embodiment, a radially inner end of the inclined surface 101B is preferably positioned above the lower end of the outer peripheral surface of the inner sleeve 231B in the axial direction. With this configuration, the lubricating oil 50B on the radially outer side of the shaft flange 312B easily flows toward the lower opening 602B of the circulation hole 60B. As a result, stagnation of the lubricating oil 50B present on the radially outer side of the shaft flange 312B can be further prevented.

3. Modification

While the example embodiments of the present disclosure have been described above, the present disclosure is not limited to the example embodiments described above.

Figure 9:
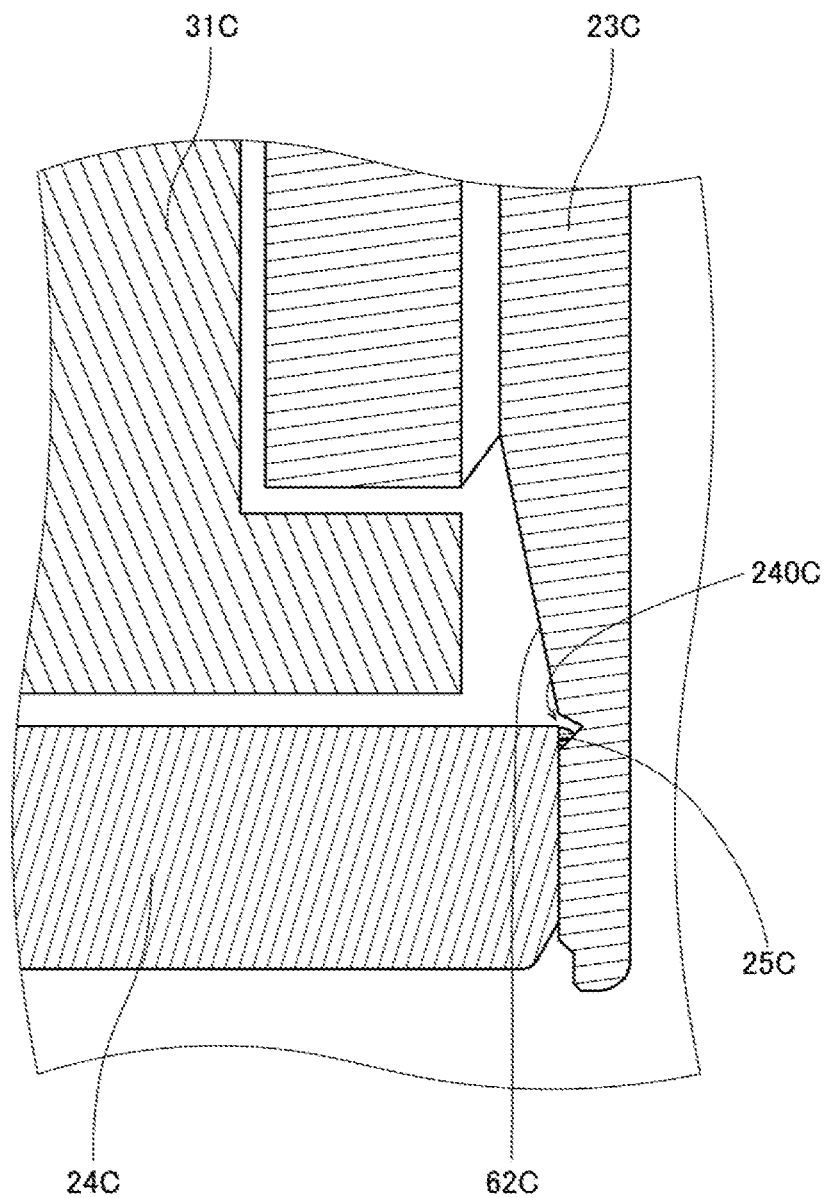
FIG. 9 is a partial longitudinal sectional view of a shaft, a sleeve, and a thruster according to a modification of an example embodiment of the present disclosure.
Figure 10:
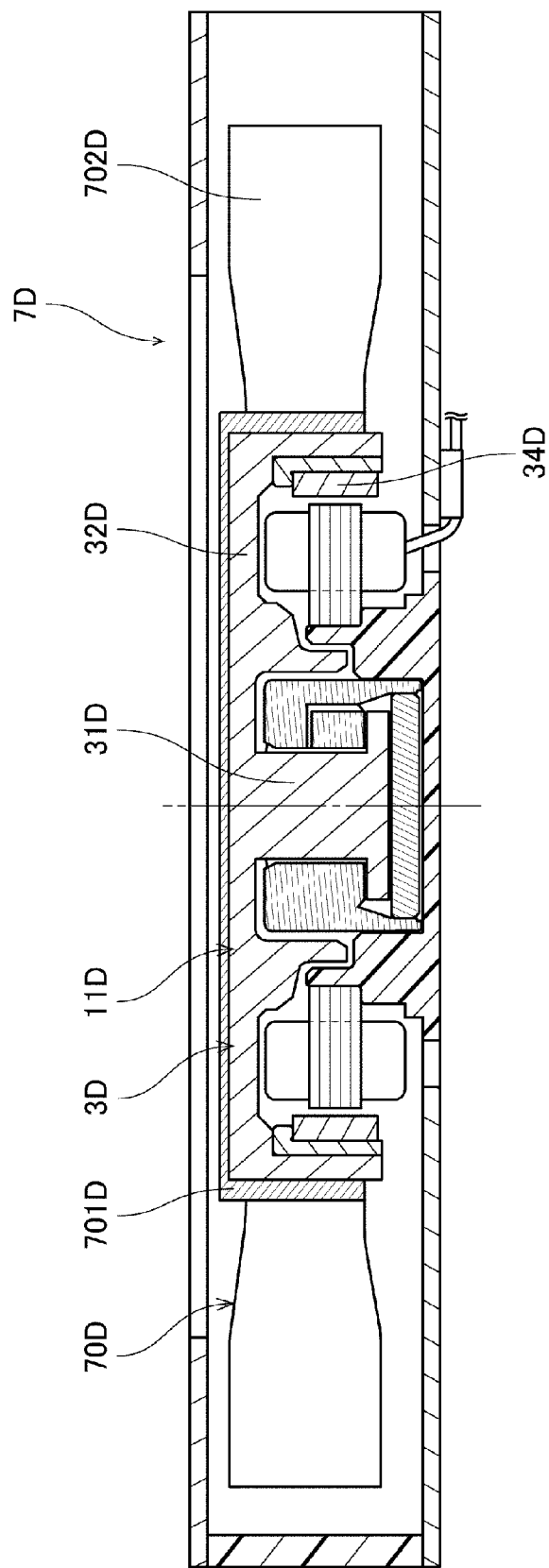
FIG. 10 is a longitudinal sectional view of a fan motor (a centrifugal fan) according to a modification of an example embodiment of the present disclosure.

FIG. 9 is a partial longitudinal sectional view of a shaft 31C, a sleeve 23C, and a thruster 24C according to a modification. In the example in FIG. 9, a recess 240C for accommodating an adhesive 25C for fixing the thruster 24C to the sleeve 23C is formed in a second inner peripheral surface 62C of the sleeve 23C. During a manufacturing process of the motor, the thruster 24C is press-fitted to a lower end of the sleeve 23C. At that time, a portion of the adhesive 25C for fixing the thruster 24C to the sleeve 23C is pushed upward from the thruster 24C and accumulated in at least a part of the recess 240C. This configuration can prevent the adhesive 25C from protruding to the shaft 31C side and interfering with the rotation of the shaft 31C.

The motors according to the above-described example embodiments and modification are used as a spindle motor for rotating a magnetic disk. However, as illustrated in FIG.

10 showing a modification, an impeller 70D having an impeller cup 701D and a plurality of blades 702D may be used instead of the magnetic disk in the present disclosure, and a motor 11D having the same structure as the motors in the above example embodiments and the modification may be used as a fan motor 7D for supplying air flow. For example, the fan motor 7D is configured such that the impeller cup 701D is fixed to a rotor hub 32D connecting a shaft 31D of a rotary section 3D and a magnet 34D, and a plurality of blades 702D extending radially outward from the impeller cup 701D is provided.

Figure 11:
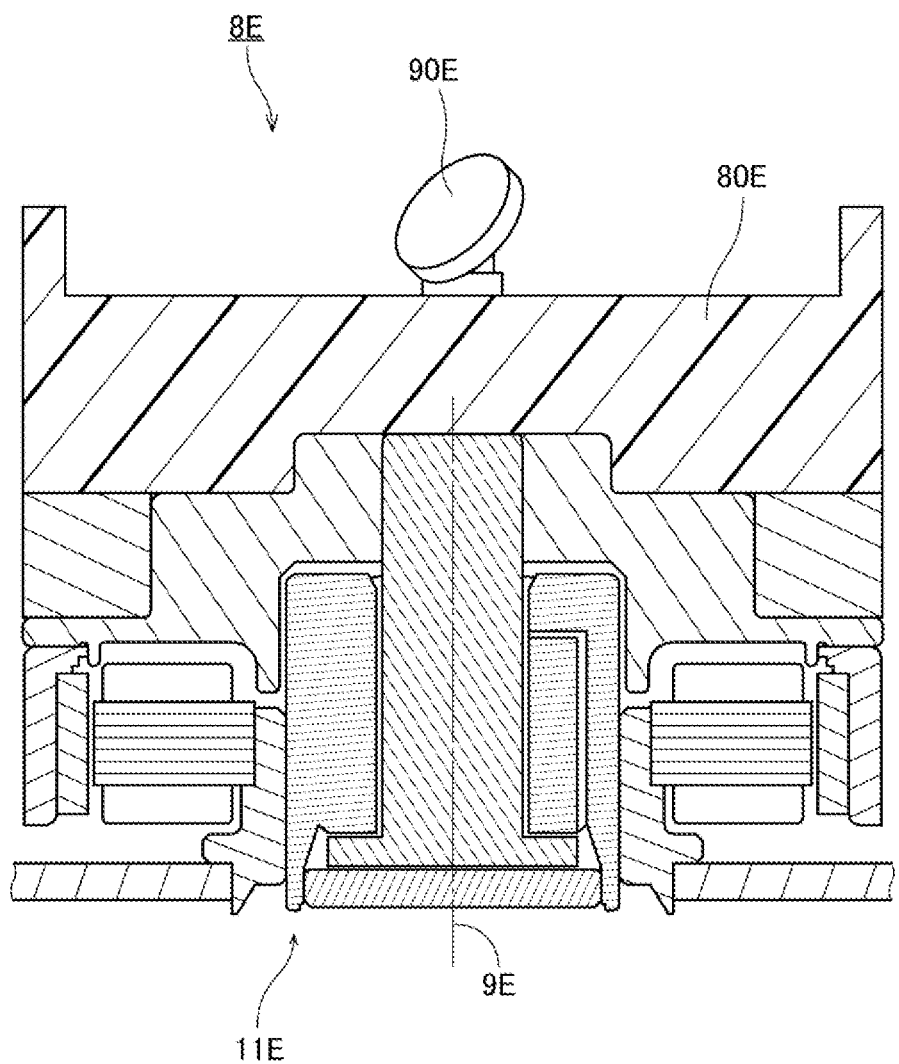
FIG. 11 is a longitudinal sectional view of a rotary drive device according to a modification of an example embodiment of the present disclosure.

As illustrated in FIG. 11 showing a modification, a flywheel 80E supporting an optical component 90E that reflects incident light entering from a light source or transmits reflected light reflected therefrom may be used instead of the magnetic disk in the present disclosure. Further, a rotary drive device 8E that rotates the flywheel 80E about a center axis 9E, while supporting the flywheel 80E may be constructed using a motor 11E having the same structure as the motors in the above example embodiments and modification.

Note that details of structures and shapes of the fluid dynamic bearing device, the motor, and the disk drive device may differ from the structures and the shapes illustrated in the accompanying drawings of the present application. The components presented in the example embodiments and the modifications described above may be combined together, as appropriate, as long as there is no inconsistency.

The present disclosure is applicable to a fluid dynamic bearing device, a motor, and a disk drive device.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A fluid dynamic bearing device comprising:
    a shaft disposed along a center axis extending vertically;
    a sleeve including a through hole into which the shaft is inserted, the sleeve cylindrically extending in an axial direction around the shaft;
    a thruster disposed below the shaft in the axial direction to close an opening in a lower end of the sleeve;
    a plurality of dynamic pressure grooves defined in at least one of an outer peripheral surface of the shaft and an inner peripheral surface of the sleeve; and
    a lubricating oil present among the shaft, the sleeve, and the thruster; wherein
    the shaft includes:
        a shaft main body extending along the center axis in a columnar shape; and
        a shaft flange extending outward in a radial direction from a lower end of the shaft main body;
    the inner peripheral surface of the sleeve includes:
        a first inner peripheral surface facing an outer peripheral surface of the shaft main body in the radial direction; and
        a second inner peripheral surface that at least partially faces an outer peripheral surface of the shaft flange in the radial direction;
    the sleeve includes:
        a sleeve inner lower surface that connects a lower end of the first inner peripheral surface and an upper end of the second inner peripheral surface and that at least partially faces the shaft flange in the axial direction; and
        at least one circulation hole that passes through an inside of the sleeve and that is open in the sleeve inner lower surface; and
    a radially outer end of a lower opening of the circulation hole is positioned above a radially inner end of the lower opening in the axial direction.

2. The fluid dynamic bearing device according to claim 1, wherein
    an outer peripheral surface of the thruster is fixed to the second inner peripheral surface of the sleeve;
    the thruster includes, in a portion including a radially outer end, a recess that is recessed downward from an upper surface; and
    the fluid dynamic bearing device further includes an adhesive to be accommodated in at least a portion of the recess.

3. The fluid dynamic bearing device according to claim 1, wherein
    the thruster is fixed to the second inner peripheral surface of the sleeve with an adhesive; and
    at least a portion of the adhesive is continuously arranged over an upper surface of the thruster and the second inner peripheral surface.

4. The fluid dynamic bearing device according to claim 1, further comprising:
    an adhesive accommodating portion defined by a gap in the radial direction between a portion of the thruster including an upper end of an outer peripheral surface of the thruster and the second inner peripheral surface of the sleeve; wherein
    the thruster is fixed to the sleeve by an adhesive; and
    a portion of the adhesive is located in the adhesive accommodating portion.

5. The fluid dynamic bearing device according to claim 1, wherein at least a portion of the second inner peripheral surface of the sleeve is an inclined surface extending downward in the axial direction, and inclined radially outward, from a portion above the thruster in the axial direction and on a radially outer side of the lower opening of the circulation hole.

6. The fluid dynamic bearing device according to claim 5, wherein the sleeve further includes:
    an inner sleeve that cylindrically extends in the axial direction above the shaft flange and on a radially outer side of the shaft main body; and
    an outer sleeve that defines at least an outer periphery and a lower end of the sleeve and includes an inner peripheral surface to which the inner sleeve is fixed;
    the second inner peripheral surface is defined on the outer sleeve; and
    a radially inner end of the inclined surface is positioned above a lower end of an outer peripheral surface of the inner sleeve in the axial direction.

7. The fluid dynamic bearing device according to claim 1, wherein the sleeve further includes:
    an inner sleeve cylindrically extending in the axial direction above the shaft flange and on a radially outer side of the shaft main body; and
    an outer sleeve that defines at least an outer periphery and a lower end of the sleeve and includes an inner peripheral surface to which the inner sleeve is fixed;
    the outer sleeve and the inner sleeve are defined by different members;
    the circulation hole is between the inner sleeve and the outer sleeve; and the lower opening is in a radial gap between a lower end of an outer peripheral surface of the inner sleeve and an inner peripheral surface of the outer sleeve.

8. A motor comprising:
the fluid dynamic bearing device according to claim 1;
a stationary section including the sleeve and a stator; and
a rotary section that includes the shaft and a magnet facing the stator, the rotary section being supported to be rotatable about the center axis with respect to the stationary section via the fluid dynamic bearing device.

9. A disk drive device comprising:
the motor according to claim 8;
an access section that carries out at least one of reading of information and writing of information from and to a disk supported by the rotary section of the motor; and
a cover; wherein
the stationary section includes a base portion that directly or indirectly supports the stator; and
the rotary section and the access section are housed in a housing including the base portion and the cover.

10. A fan motor comprising:
the motor according to claim 8; and
an impeller including an impeller cup that is fixed to a rotor hub that connects the shaft and the magnet, and a plurality of blades extending radially outward from the impeller cup.

11. A rotary drive device that rotates a flywheel supporting an optical component reflecting incident light entering from a light source or transmitting reflected light, the rotary drive device comprising:
the motor according to claim 8; and
a flywheel that is supported by the motor and that rotates about the center axis.

12. A fluid dynamic bearing device comprising:
a shaft disposed along a center axis extending vertically;
a sleeve including a through hole into which the shaft is inserted, the sleeve cylindrically extending in an axial direction around the shaft;
a thruster disposed below the shaft in the axial direction to close an opening in a lower end of the sleeve;
a plurality of dynamic pressure grooves defined in at least one of an outer peripheral surface of the shaft and an inner peripheral surface of the sleeve; and
a lubricating oil present among the shaft, the sleeve, and the thruster; wherein
the shaft includes:
 a shaft main body extending along the center axis in a columnar shape; and
 a shaft flange extending outward in a radial direction from a lower end of the shaft main body;
the inner peripheral surface of the sleeve includes:
 a first inner peripheral surface facing an outer peripheral surface of the shaft main body in the radial direction; and
 a second inner peripheral surface that at least partially faces an outer peripheral surface of the shaft flange in the radial direction;
the sleeve includes:
 a sleeve inner lower surface that connects a lower end of the first inner peripheral surface and an upper end of the second inner peripheral surface and that at least partially faces the shaft flange in the axial direction; and
 at least one circulation hole that passes through an inside of the sleeve and that is open in the sleeve inner lower surface; and at least a portion of the second inner peripheral surface of the sleeve is defined by an inclined surface extending downward in the axial direction, and inclined radially outward, from a portion above the thruster in the axial direction and on a radially outer side of the lower opening of the circulation hole.

13. The fluid dynamic bearing device according to claim 12, wherein
an outer peripheral surface of the thruster is fixed to the second inner peripheral surface of the sleeve;
the thruster includes, in a portion including a radially outer end, a recess that is recessed downward from an upper surface; and
the fluid dynamic bearing device further includes an adhesive accommodated in at least a portion of the recess.

14. The fluid dynamic bearing device according to claim 12, wherein
the thruster is fixed to the second inner peripheral surface of the sleeve by an adhesive; and
at least a portion of the adhesive is continuously arranged over an upper surface of the thruster and the second inner peripheral surface.

15. The fluid dynamic bearing device according to claim 12, further comprising:
an adhesive accommodating portion that is defined by a gap in the radial direction between a portion of the thruster including an upper end of an outer peripheral surface of the thruster and the second inner peripheral surface of the sleeve; wherein
the thruster is fixed to the sleeve by an adhesive; and
a portion of the adhesive is located in the adhesive accommodating portion.

16. The fluid dynamic bearing device according to claim 12, wherein a radially inner end of the inclined surface is positioned above a radially inner end of the lower opening in the axial direction.

17. The fluid dynamic bearing device according to claim 12, wherein the sleeve further includes:
an inner sleeve cylindrically extending in the axial direction above the shaft flange and on a radially outer side of the shaft main body; and
an outer sleeve that defines at least an outer periphery and a lower end of the sleeve and has an inner peripheral surface to which the inner sleeve is fixed,
the outer sleeve and the inner sleeve are defined by different members;
the circulation hole is between the inner sleeve and the outer sleeve; and
the lower opening is provided in a radial gap between a lower end of an outer peripheral surface of the inner sleeve and an inner peripheral surface of the outer sleeve.

18. The fluid dynamic bearing device according to claim 12, wherein the sleeve further includes:
an inner sleeve that cylindrically extends in the axial direction above the shaft flange and on a radially outer side of the shaft main body; and
an outer sleeve that defines at least an outer periphery and a lower end of the sleeve and includes an inner peripheral surface to which the inner sleeve is fixed;
the second inner peripheral surface is defined on the outer sleeve; and
a radially inner end of the inclined surface is positioned above a lower end of an outer peripheral surface of the inner sleeve in the axial direction.

* * * * *